(12) United States Patent
Sullivan

(10) Patent No.: US 10,621,887 B2
(45) Date of Patent: Apr. 14, 2020

(54) SYSTEM AND METHOD FOR TRAINING USE OF A TOOTHBRUSH

(71) Applicant: Clint Sullivan, New Plymouth (NZ)

(72) Inventor: Clint Sullivan, New Plymouth (NZ)

( * ) Notice: Subject to any disclaimer, the term of this patent is extended or adjusted under 35 U.S.C. 154(b) by 265 days.

(21) Appl. No.: 15/509,903

(22) PCT Filed: Sep. 8, 2015

(86) PCT No.: PCT/NZ2015/050133
§ 371 (c)(1),
(2) Date: Mar. 9, 2017

(87) PCT Pub. No.: WO2016/039639
PCT Pub. Date: Mar. 17, 2016

(65) Prior Publication Data
US 2017/0263149 A1 Sep. 14, 2017

(30) Foreign Application Priority Data
Sep. 10, 2014 (NZ) ........................ 630755

(51) Int. Cl.
*G09B 19/00* (2006.01)
*A46B 15/00* (2006.01)
(Continued)

(52) U.S. Cl.
CPC ...... *G09B 19/0084* (2013.01); *A46B 15/0004* (2013.01); *A46B 15/004* (2013.01);
(Continued)

(58) Field of Classification Search
CPC ....... A61C 17/221; A61C 17/16; A61C 17/22; A61C 17/34; A46B 15/0012;
(Continued)

(56) References Cited

U.S. PATENT DOCUMENTS 5,493,747 A * 2/1996 Inakagata .......... A61C 17/3418
15/22.1
6,536,068 B1 3/2003 Yang et al.
(Continued)

FOREIGN PATENT DOCUMENTS

WO 2014102667 A1 7/2014

OTHER PUBLICATIONS

International Search Report and Written Opinion issued in PCT Application No. PCT/NZ2015/050133 dated Dec. 7, 2015.
(Continued)

*Primary Examiner* — Jerry-Daryl Fletcher
(74) *Attorney, Agent, or Firm* — LeonardPatel P.C.; Michael Aristo Leonard, II; Sheetal Suresh Patel

(57) ABSTRACT

A system and method of use to train a user the correct use of a toothbrush are provided. A typical user may be a child, and correct use may include not biting the toothbrush. Accordingly the system includes a toothbrush capable of detecting when it is bitten. This may be achieved by including a sensor capable of detecting pressure applied to a head and/or a brush assembly of the toothbrush from two opposing directions at the same time. The user may initially be provided with training material that encourages the user to associate correct use of the toothbrush with a (pleasurable) sound. When the user brushes his or her teeth without biting the toothbrush, the sound associated with correct use is provided by an audio device. If the user bites the toothbrush, the sound is switched off until the bite is released and normal brushing recommences.

19 Claims, 3 Drawing Sheets

(51) Int. Cl.
*G01L 5/16* (2020.01)
*G01L 5/00* (2006.01)
*G01L 5/163* (2020.01)

(52) U.S. Cl.
CPC ............ *A46B 15/0006* (2013.01); *G01L 5/16* (2013.01); *A46B 2200/1066* (2013.01); *G01L 5/0038* (2013.01); *G01L 5/163* (2013.01)

(58) Field of Classification Search
CPC ............ A46B 15/0004; A46B 15/0002; A46B 15/0038; A46B 2200/1066; A46B 15/0022; A46B 15/004; G09B 19/0084; G09B 23/283; G09B 5/065; A61N 2005/0606; A61N 2005/0644; G01L 5/16
See application file for complete search history.

(56) References Cited

U.S. PATENT DOCUMENTS

| | | |
|---|---|---|
| 7,845,041 B2 | 12/2010 | Gatzemeyer et al. |
| 2011/0041270 A1 | 2/2011 | Chen |
| 2014/0065588 A1 | 3/2014 | Jacobson et al. |
| 2015/0297327 A1* | 10/2015 | Miller ................ A46B 15/0012 15/22.1 |

OTHER PUBLICATIONS

Examination Report issued in New Zealand Application No. 630755 dated Sep. 24, 2014.

* cited by examiner

SYSTEM AND METHOD FOR TRAINING USE OF A TOOTHBRUSH

CROSS REFERENCE TO RELATED APPLICATIONS

This application is a U.S. national stage application under 35 U.S.C. § 371 of PCT Application Number PCT/NZ2015/050133 filed on Sep. 8, 2015, which claims the benefit of New Zealand Patent Application Number 630755 filed on Sep. 10, 2014. The subject matter of these earlier filed patent applications is hereby incorporated by reference in its entirety.

FIELD

The present invention generally relates to a toothbrush, and a system and method of using the system, to aid training in the use of the toothbrush. In particular, the present invention applies to a system and method for training young children in the use of the toothbrush.

BACKGROUND

Many parents encounter problems when initially training their children to clean their teeth correctly. Not only should the child be encouraged to clean his or her teeth, but also to develop good habits when cleaning, and to discourage bad habits.

There is a relatively large number of prior art devices that may address this problem. For example, U.S. Pat. No. 7,845,041 (John Gatzemeyer et al.) generally discusses a toothbrush including an input and a memory for storing audio signals received via the input, and an output for playing the stored audio signals. The general idea is that a user can input his or her own content (e.g., music, etc.) from an external device (e.g., a CD/DVD player or download from the Internet) into the memory. The content may then be played back to the user while brushing his or her teeth, thus encouraging the user to use the toothbrush. In some prior devices of this kind, the length of the recording/playback period may be chosen to correspond with a period (often around 2 minutes) of use of the toothbrush as recommended for good oral health.

While toothbrushes of this general type may enhance the cleaning activity, they do not provide any feedback on how the toothbrush is being used. This can make them unsuitable for training proper teeth cleaning techniques.

A toothbrush training system that does provide real-time feedback and tuition on use of a toothbrush is generally discussed in U.S. Patent Application Publication No. 2014/0065588 A1 (Dov Jacobson et. al). This system includes an instrumented toothbrush with optional feedback elements that interact with a real-time dynamic audio-visual program, which provides guidance, assessment, and feedback to the user on correct brushing techniques.

In one embodiment, Jacobson et al. generally discusses a system including the instrumented toothbrush, a multimedia controller containing an application program, a wireless transceiver for communication between the toothbrush and the controller, a visual display (such as a television display or a computer monitor), and a remote audio system.

While the system disclosed by Jacobson et al. may provide comprehensive feedback and training to a user, its complexity, including all the peripheral devices, is likely to make it attractive to high-end users only—i.e., those who already have all the peripheral devices and can afford the cost of the instrumented toothbrush.

Biting the toothbrush is one bad habit often displayed by young children when learning to use a toothbrush. Jacobson et al. does not disclose a toothbrush that detects biting.

Accordingly, it may be beneficial to provide a relatively simple and inexpensive toothbrush and training system that may be used in training any young child the correct use of a toothbrush, and especially to detect and discourage the child from biting the head of the toothbrush.

SUMMARY

Certain embodiments of the present invention may provide solutions to the problems and needs in the art that have not yet been fully identified, appreciated, or solved by current toothbrush technologies. For example, some embodiments of the present invention relate to a system, and method of use of the system, to train a user in the correct use of a toothbrush. A typical user may be a child, and correct use may include not biting the toothbrush. Accordingly, the system includes a toothbrush capable of detecting when it is bitten. It is an object of some embodiments of the present invention to address the foregoing problems in the art or at least to provide the public with a useful choice.

The user may initially be provided with a training material (book, CD, DVD etc.) that encourages the user to associate correct use of the toothbrush with a (pleasurable) sound. When the user brushes his or her teeth without biting the toothbrush, the sound associated with correct use is provided by an audio device (e.g., a speaker, headphones, etc.). If the user bites the toothbrush, the sound is switched off until such time as the bite is released and normal brushing recommences.

According to one aspect of the present invention, there is provided a toothbrush for use as a training device. The toothbrush includes a handle, a head attached to or attachable to the handle a brush assembly attached to or attachable to the head, and a first sensor. The first sensor is configured to sense pressure applied to the head and/or the brush assembly from two opposing directions at the same time.

According to another aspect of the present invention, there is provided a system for training proper use of a toothbrush. The system includes a toothbrush substantially as described above, an audio output device, and a control device. The control device activates the audio output device to provide audio output when the toothbrush is in use and stops the audio output when the first sensor detects pressure applied to the head and/or the brush assembly from two opposing directions at the same time.

In some embodiments, the audio output device and/or the control device are housed in the toothbrush. In other embodiments, the audio output device and/or the control device are separate from the toothbrush. In some embodiments where the control device and/or the output device are separate from the toothbrush, the output device and/or the control device communicate with the toothbrush via a cable. In some other embodiments where the control device and/or the output device are separate from the toothbrush, the output device and/or the control device communicate wirelessly with the toothbrush.

In some embodiments, the toothbrush includes an on-switch that, when activated, provides power to the control device and the audio output device. In some embodiments, the on switch, when activated, provides power to the brush assembly. In certain embodiments, the toothbrush includes an off-switch that, when activated, disconnects power from the control device and/or the audio output device and/or the brush assembly. In some embodiments, the on-switch and the off-switch are provided by a single switch using different modes of operation. For example, a single switch may be configured to switch the power on when initially activated and to switch the power off when activated a second time. The toothbrush may include a power supply configured to provide power to the control device and/or the audio output device and/or the brush assembly when the on-switch is activated. The power supply included in the toothbrush may include a battery. In other embodiments, the toothbrush is configured to connect to an external power source, and either includes or lacks its own power supply (e.g., a battery).

In some embodiments, the sensor is a mechanical sensor. The mechanical sensor may be a contact switch, for example. Use of a contact switch located on or within the toothbrush may reduce complexity and cost of producing the toothbrush relative to prior devices. In certain embodiments, the toothbrush includes a first sensor and a second sensor. In some embodiments, the first sensor is located in the vicinity of the brush assembly. The first sensor may be a first contact switch that, in normal operation, is in a closed position. When pressure is applied to the first sensor from both sides of the first sensor, the first contact switch may move to an open position, thus breaking a circuit.

In some embodiments, the second sensor is located in the vicinity of a neck of the toothbrush, the neck being a region of the head that is in the vicinity of the handle. This sensor may be a contact switch that, in normal operation, is in an open position. When a user applies pressure against his or her teeth, the head of the toothbrush flexes relative to the handle. This flexure may cause the contact switch to move to a closed position, thus closing a circuit. In such embodiments, the second sensor acts as the on/off switch.

In some embodiments, the audio output from the audio output device corresponds with a sound described in or provided by a training material. In certain embodiments, the training material is provided by printed material. In some embodiments, the training material may be provided by an audio or audiovisual device.

In some embodiments, the system includes a remote on/off control configured to emit an off signal and the toothbrush includes a receiver configured to receive the off signal from the remote on/off control and, upon receipt of the off signal to turn the toothbrush off. In these embodiments, the remote on/off control may be used by a parent or care giver, for example, to stop the operation of the toothbrush should the parent or caregiver decide it is being used incorrectly.

According to another aspect of the present invention, there is provided a method of use of a system for training a user to use a toothbrush. The system includes a toothbrush having a handle, a head attached to or attachable to the handle, a brush assembly attached to or attachable to the head, and a sensor. The sensor is configured to sense pressure applied to the head and/or the brush assembly from two opposing directions at the same time. The system also includes an audio output device and a control device. The method includes providing training material for use with the toothbrush. The training material describes or provides a sound corresponding to correct use of the toothbrush. The described or provided sound corresponds to a sound produced by the audio output of the audio output device. The method also includes using the training material to familiarize the user with the described or provided sound and providing power to a control device and/or the sensor included in the toothbrush. The method further includes detecting normal use of the toothbrush with the control device, normal use being the absence of a signal from the sensor and using the control device to activate the audio output device to produce the described or provided sound during normal use of the toothbrush. Additionally, the method includes sending a signal from the sensor to the control device when the sensor senses pressure applied to the head and/or the brush assembly from two opposing directions at the same time and deactivating the audio output device to stop producing the described or provided sound when the control device receives the signal from the sensor. The method of detecting use substantially as described above may be repeated until use of the toothbrush is finished.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to a system, and method of use of the system, to train a user in the correct use of a toothbrush. An object of many embodiments of the present invention is to provide a relatively simple and inexpensive instrumented toothbrush and training system for teaching a user (predominantly a child) proper use of the toothbrush, and particularly, to discourage him or her from biting the toothbrush. The embodiment described below is therefore aimed at providing a solution to the above object. Those skilled in the art will appreciate that there will be many possible embellishments, so reference only to the embodiment described below herein should not be seen as limiting.

Figure 1:
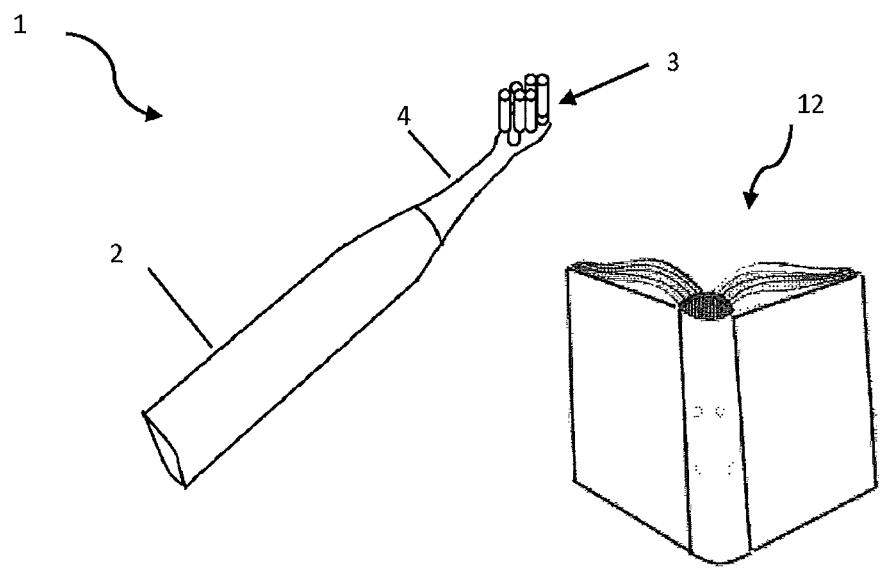
FIG. 1 shows a schematic view of a toothbrush training system, according to one embodiment of the present invention.

A toothbrush according to an embodiment of the present invention is generally indicated by arrow 1 in FIG. 1. The toothbrush includes a handle 2 and a brush assembly 3 attached to a head 4. In this embodiment, the head is attached to the handle 2.

Figure 2:
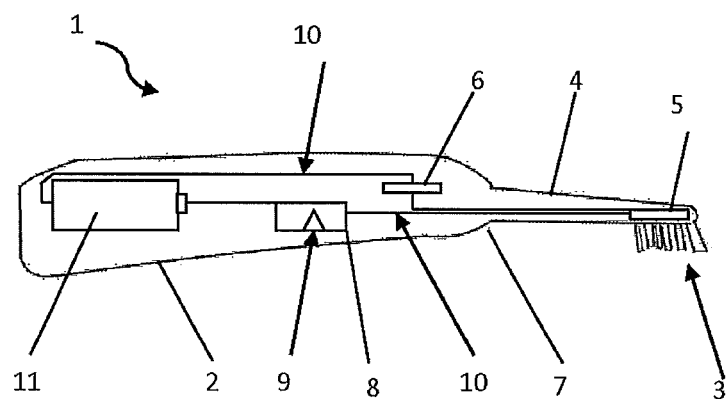
FIG. 2 shows a schematic cut away view of the toothbrush, according to the embodiment shown in FIG. 1.

FIG. 2 shows a cutaway view through the toothbrush 1 showing a first sensor 5 in the form of a normally closed contact switch, and a second sensor 6 in the form of a normally open contact switch. The first sensor 5 is located in or on the head 4 in the vicinity of the brush assembly 3. The second sensor 6 is located in or on the handle 2 near a neck 7 between the handle 2 and the head 4.

The contact switch of the first sensor 5 is configured to remain closed at all times unless pressure is applied to the head and/or the brush assembly from two opposing directions at the same time, at which time the contact switch opens, thus breaking contact with the circuit 10. The contact switch of the second sensor 6 is configured to remain open at all times unless pressure is applied to the head and/or the brush from the brush assembly side only, at which time the contact switch closes. The pressure applied to the head 4 and/or the brush from the brush assembly side corresponds to the pressure exerted on the head 4 and/or the brush assembly 3 during normal use of the toothbrush 1.

In the system of an embodiment of the present invention, the toothbrush 1 includes an audio output device 8 that outputs an audio signal to be played through a speaker 9. The audio output device 8 may be any of the wide range of such devices as is known in the art. In some embodiments, the audio output device 8 outputs an audio signal of a pre-loaded sound, such as laughter or giggling. Of course, more sophisticated devices may be used, such as MP3 players, which may be preloaded with sounds, music recordings, etc., that are replayed when the toothbrush is being use in a normal fashion. The circuit 10 includes a power source in the form of a battery 11.

Some embodiments of the system include a control device configured to receive signals from the first sensor and the second sensor and to activate the audio output device to provide audio output when the toothbrush is in normal use and to stop the audio output when the sensor detects pressure applied to the head and/or the brush assembly from two opposing directions at the same time. Normal use corresponds to use of the toothbrush without biting the head/brush assembly.

Figure 3A:
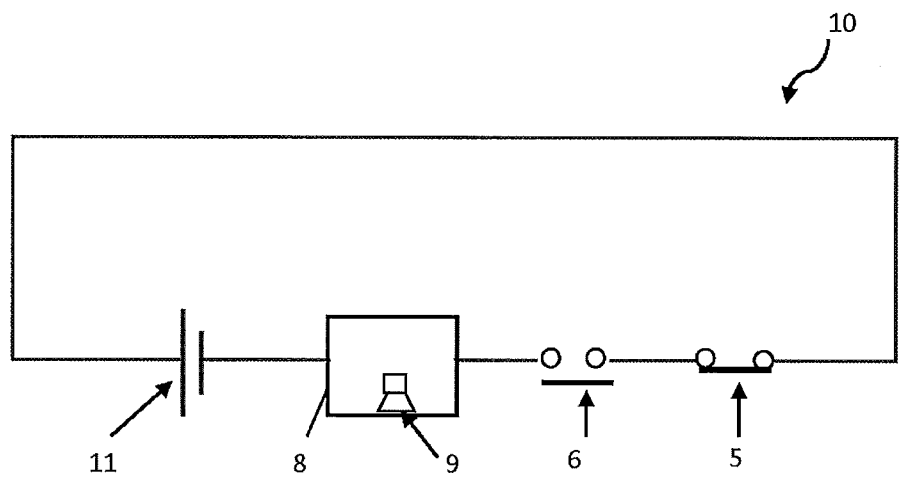
FIG. 3a shows a control device in the form of a circuit in one condition.

In some embodiments, in keeping with the approach to simplicity, the control device is in the form of a simple circuit 10, as shown in FIGS. 3a-3d. FIG. 3a shows the circuit 10 when the toothbrush is not in use. The circuit includes: a normally on contact switch as the first sensor 5; a normally off contact switch as the second sensor 6; a power source in the form of a battery 11 (located within the handle 2) and an audio output device 8 including a speaker 9. In this condition, the circuit 10 is broken by the second sensor 6, so no power is delivered to the circuit 10.

Figure 3B:
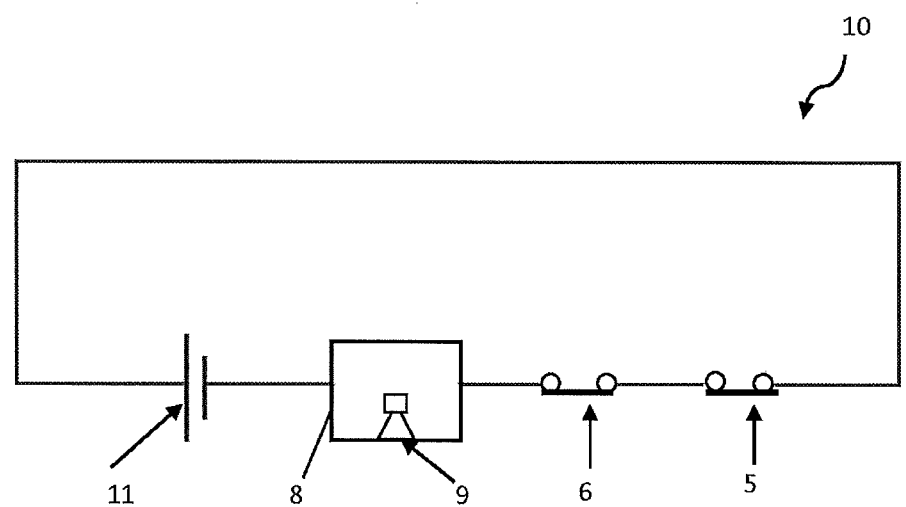
FIG. 3b shows the control device of FIG. 3a in another condition.

FIG. 3b shows the circuit 10 when the toothbrush is in normal use. In this case, the contact switch of the first sensor 5 is closed. The contact switch of the second sensor 6 is also closed due to the pressure applied to the head/brush assembly causing flexure of the head 4 of the toothbrush with respect to the handle 2. In this condition, with both contact switches closed, power is supplied to the circuit, which activates the audio output device 8 to provide an audio signal to the speaker 9.

Figure 3C:
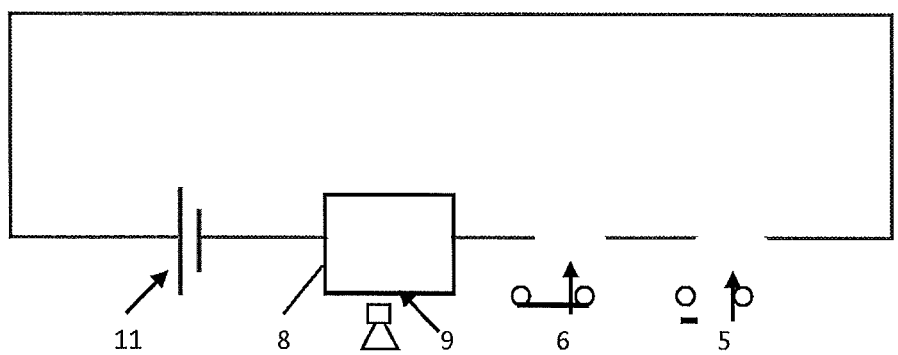
FIG. 3c shows the control device of FIG. 3a in yet another condition.

FIG. 3c shows the circuit 10 when the head 4/brush assembly 3 is bitten. The contact switch of the first sensor 5 is configured to open when pressure is applied to both sides of the contact switch at the same time, as may occur if the head/brush assembly is bitten. In this condition, the contact switch of the first sensor 5 is open and the contact switch of the second sensor 6 is closed. Opening the first contact switch breaks the circuit 10 so no power is provided to the audio output device 8 and no sound is produced by the speaker 9.

Figure 4:
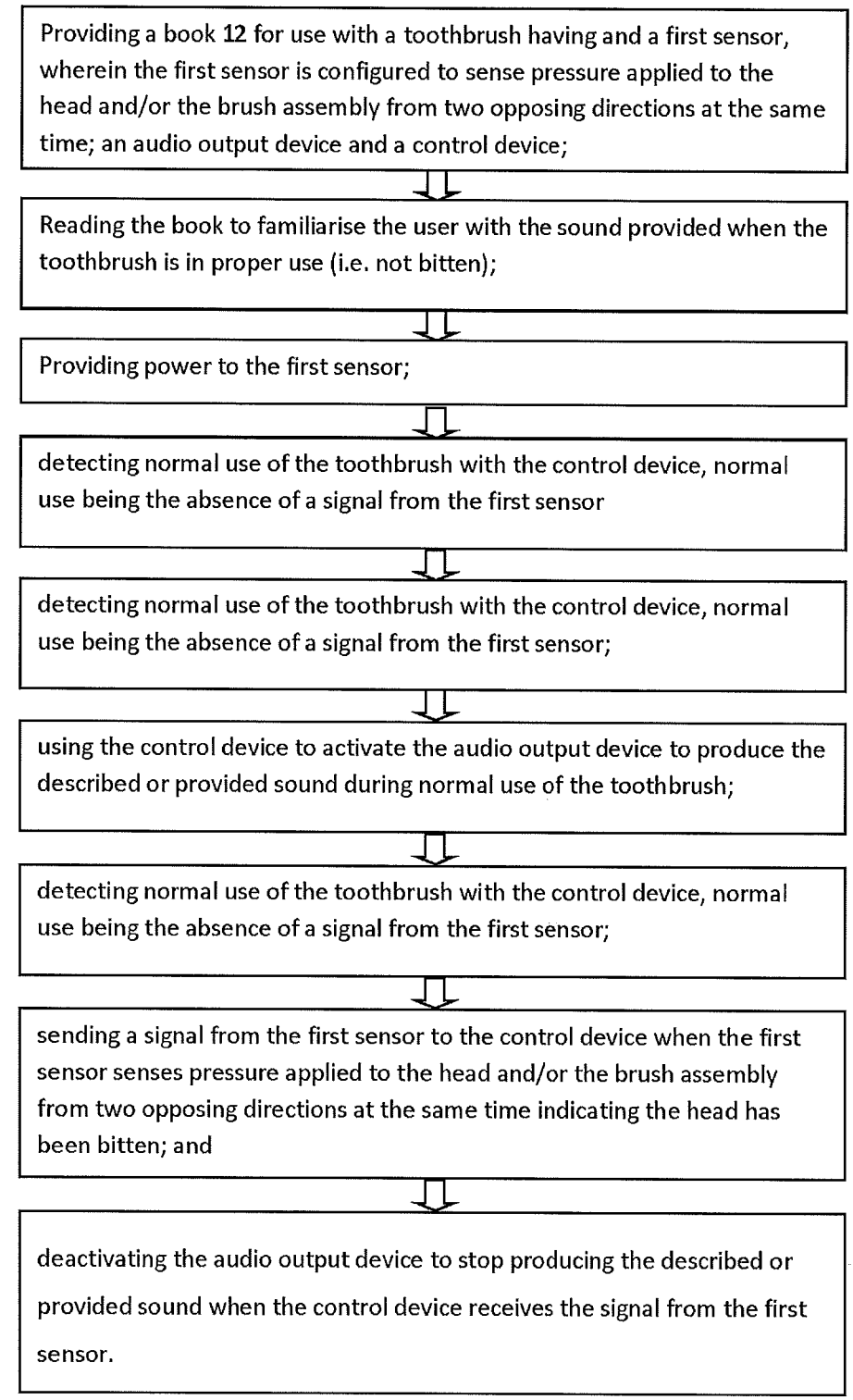
FIG. 4 shows a schematic flow chart of a training method, according to one embodiment of the present invention.

In the first step of the method of use of the training system, training material in the form of a book 12 (see FIG. 4) is provided to the user of the toothbrush, which generally will be a young child. The book includes text that describes the sound associated with normal use of the toothbrush. The text of the book may be specifically written to encourage a child to use the toothbrush correctly. As such, the sound described should be one known to the child, and which may bring the child pleasure. In such an embodiment, the sound may be of giggling. This is an infectious sound that may be well known to children, and one they are likely to associate with pleasure. Of course, any sound that fulfills the above criteria may be used.

In the second step of the method, the child is encouraged to read the book 12 and to become familiar with the associated sound. In the remaining steps of the method, the child is encouraged to use the toothbrush in a correct manner (no biting). When pressure is applied to the head/brush assembly under normal use, the circuit is closed as described above, thus outputting the sound described in the book.

If the head/brush assembly of the toothbrush is bitten (as determined by pressure being applied to both sides of the head/brush assembly at the same time), the contact switch of the first sensor opens and the sound stops. The sound may be reactivated by releasing the bite. Thus, the child may be encouraged to use the toothbrush properly without biting it by using the sound provided as a positive feedback to his or her use of the toothbrush.

In some embodiments, the toothbrush and training system includes a remote on/off control configured to send a signal to a receiver connected to the circuit in the toothbrush. The receiver may be configured to break the circuit when a signal from the remote on/off control is received by the receiver in the circuit. This embodiment may be used by a parent or care giver to stop operation of the toothbrush if it is not being used correctly.

All references, including any patents or patent applications cited in this specification, are hereby incorporated by reference. No admission is made that any reference constitutes prior art. The discussion of the references states what their authors assert, and Applicant reserves the right to challenge the accuracy and pertinency of the cited documents. It will be clearly understood that although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What I claimed is:

1. A toothbrush for use in a method of training a user in normal use of the toothbrush, comprising:
   a handle;
   a head attached to or attachable to the handle;
   a brush assembly attached to or attachable to the head; and
   a first sensor configured in use to detect an indicator of incorrect use of the toothbrush;
   a control device configured in use to receive a signal from the first sensor, the signal indicating incorrect use of the toothbrush; and
   an audio output device configured in use to provide an audio output, wherein the control device is configured in use to activate the audio output device to provide the audio output in the absence of a signal from the first sensor to the control device, which indicates when then toothbrush is being used normally, and
   the control device is configured in use to stop the audio output device from producing the audio output on receipt from the first sensor of the signal indicating incorrect use of the toothbrush.

2. The toothbrush of claim 1, wherein the first sensor comprises a normally on contact switch.

3. The toothbrush of claim 1, further comprising:
   a second sensor configured in use to detect an indicator of normal use of the toothbrush, wherein
   the control device is configured in use to receive a signal from the second sensor, the signal indicating normal use of the toothbrush, and
   the control device activates the audio output device to provide the audio output on receipt from the second sensor of the signal indicating normal use of the toothbrush.

4. The toothbrush of claim 3, wherein the second sensor comprises a normally off contact switch.

5. The toothbrush of claim 3, wherein the second sensor is configured in use to sense pressure applied to at least one of the head and the brush assembly from a brush assembly side only.

6. The toothbrush of claim 1, wherein at least one of the audio output device and the control device are housed in the toothbrush.

7. The toothbrush of claim 1, wherein at least one of the audio output device and the control device are not housed in the toothbrush.

8. The toothbrush of claim 7, wherein at least one of the output device and the control device communicate with the toothbrush via a cable.

9. The toothbrush of claim 7, wherein at least one of the output device and the control device communicate wirelessly with the toothbrush.

10. The toothbrush of claim 1, further comprising:
    a remote on/off control configured in use to emit an off signal; and
    a receiver configured in use to receive the off signal from the remote on/off control and, upon receipt of the off signal, to turn the toothbrush off.

11. The toothbrush of claim 1, wherein the audio output from the audio output device corresponds to a sound described in or provided by a training material.

12. The toothbrush of claim 11, wherein the training material is provided by printed material.

13. The toothbrush of claim 11, wherein the training material is provided by an audio device or an audiovisual device.

14. The toothbrush of claim 1, wherein the first sensor is configured in use to detect incorrect use of the toothbrush when the first sensor senses pressure applied to at least one of the head and the brush assembly from two opposing directions at the same time.

15. A method of use of a system for training a user to use a toothbrush, the system comprising: a toothbrush comprising a handle, a head attached to or attachable to the handle, a brush assembly attached to or attachable to the head, a first sensor configured in use to detect an indicator of incorrect use of the toothbrush, an audio output device configured in use to provide an audio output, and a control device configured in use to receive a signal from the first sensor, the signal indicating incorrect use of the toothbrush, the method comprising:

(a) providing a training material for use with the toothbrush, wherein the training material describes or provides a sound corresponding to correct use of the toothbrush, and the described or provided sound corresponds to a sound produced by the audio output of the audio output device;
   (b) using the training material to familiarize the user with the described or provided sound;
   (c) providing power to at least one of the control device and to the first sensor of the toothbrush;
   (d) detecting normal use of the toothbrush with the control device, normal use being the absence of a signal from the first sensor;

(e) using the control device to activate the audio output device to produce the described or provided sound during normal use of the toothbrush;

(f) sending a signal from the first sensor to the control device when the first sensor detects an indicator of incorrect use of the toothbrush; and (g) deactivating the audio output device to stop producing the described or provided sound when the control device receives the signal from the first sensor.

16. The method of claim 15, wherein the toothbrush further comprises a second sensor configured in use to detect an indicator of normal use of the toothbrush, the method further comprises sending a signal from the second sensor to the control device when the second sensor detects normal use of the toothbrush, the step of providing power to at least one of the control device and to the first sensor is initiated by the signal from the second sensor indicating normal use of the toothbrush, and in the step of detecting normal use of the toothbrush with the control device, normal use of the toothbrush is indicated by receipt of the signal from the second sensor.

17. The method of claim 16, wherein the second sensor is configured in use to sense normal use of the toothbrush when the second sensor senses pressure applied to at least one of the head and the brush assembly from a brush assembly side only.

18. The method of claim 15, further comprising:

repeating steps (d) to (g) until use of the toothbrush is finished.

19. The method of claim 15, wherein the first sensor is configured in use to detect incorrect use of the toothbrush when the first sensor senses pressure applied to at least one of the head and the brush assembly from two opposing directions at the same time.

* * * * *